(12) United States Patent
Littau et al.

(10) Patent No.: US 7,938,890 B2
(45) Date of Patent: May 10, 2011

(54) SEPARATING GAS USING IMMOBILIZED BUFFERS

(75) Inventors: Karl Anthony Littau, Palo Alto, CA (US); Francisco E. Torres, San Jose, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 419 days.

(21) Appl. No.: 12/168,953

(22) Filed: Jul. 8, 2008

(65) Prior Publication Data

US 2010/0005959 A1      Jan. 14, 2010

(51) Int. Cl.
*B01D 63/06* (2006.01)

(52) U.S. Cl. .............. 96/4; 95/45; 95/51; 96/5; 96/7; 96/8; 96/11; 204/275.1; 205/555; 429/412

(58) Field of Classification Search ........... 96/4, 5, 96/7, 8, 10–12; 95/45, 51; 429/410–412; 204/242, 275.1; 205/555
See application file for complete search history.

(56) References Cited

U.S. PATENT DOCUMENTS

| | | | |
|---|---|---|---|
| 3,511,712 A | 5/1970 | Giner | |
| 3,676,220 A * | 7/1972 | Ward, III | 204/277 |
| 4,002,493 A | 1/1977 | Warszawski | |
| 4,117,079 A | 9/1978 | Bellows | |
| 4,250,000 A * | 2/1981 | Kuck et al. | 205/452 |
| 5,133,842 A * | 7/1992 | Taylor et al. | 205/532 |
| 5,258,106 A | 11/1993 | Habermann et al. | |
| 5,472,585 A | 12/1995 | Dinella et al. | |
| 5,597,863 A | 1/1997 | Linder et al. | |
| 5,773,645 A | 6/1998 | Hochstrasser | |
| 6,579,343 B2 | 6/2003 | Brennecke et al. | |
| 6,793,711 B1 * | 9/2004 | Sammells | 95/48 |
| 6,908,500 B2 * | 6/2005 | Fisher et al. | 96/6 |
| 7,763,097 B2 * | 7/2010 | Federspiel et al. | 95/46 |
| 2005/0154247 A1 * | 7/2005 | Jong et al. | 585/862 |
| 2007/0119302 A1 | 5/2007 | Radosz et al. | |
| 2008/0115667 A1 * | 5/2008 | Lee et al. | 95/51 |
| 2009/0159456 A1 | 6/2009 | Littau | |
| 2009/0233155 A1 | 9/2009 | Littau | |

FOREIGN PATENT DOCUMENTS

DE      3617280 A1 * 11/1987

(Continued)

OTHER PUBLICATIONS

Winnick, J., Marshall, R.D., and Schubert, F.H., "An Electrochemical Device for Carbon Dioxide Concentration. I. System Design and Performance," Ind. Eng. Chem., Process Des. Develop., vol. 13, No. 1, 1974, pp. 59-63.

(Continued)

*Primary Examiner* — Richard L Chiesa
(74) *Attorney, Agent, or Firm* — Hollingsworth & Funk, LLC (57) ABSTRACT

A layered structure can be formed having immobilized or segregated pH buffering groups that can be used to separate carbon dioxide or other gases. The pH buffering groups can be immobilized within a matrix, confined within a gel, or segregated by a semi-permeable membrane. The pH buffering groups can be configured to increase the efficiency of the system by maintaining a desirable pH profile within the cell and to permit the flow of the carbon-containing ions within the system while controlling diffusion of protons and/or hydroxyl ions.

16 Claims, 7 Drawing Sheets

FOREIGN PATENT DOCUMENTS

| EP | 1 935 476 A1 | 6/2008 |
|---|---|---|
| JP | 63049232 | 3/1988 |
| WO | WO 2004/104548 A2 | 12/2004 |
| WO | WO 2005/061422 A1 | 7/2005 |

OTHER PUBLICATIONS

Scovazzo, P., Poshusta, J., Dubois, D., Koval, C., and Noble, R., "Electrochemical Separation and Concentration of <1% Carbon Dioxide from Nitrogen," Journal of the Electrochemical Society, vol. 150, No. 5, 2003, pp. D91-D98.

Sugiura, K., Takei, K., Tanimoto, K., Miyazaki, Y., "The carbon dioxide concentrator by using MCFC," Jour. of Power Sources, vol. 118, 2003, pp. 218-227.

Lang, C.M., Kim, K., and Kohl, P.A., "High-Energy Density, Room-Temperature Carbonate Fuel Cell," Electrochemical and Solid-State Letters, vol. 9, No. 12, 2006, pp. A545-A548.

European Search Report and Annex to European Search Report on European Patent Application No. EP 09 16 4825, Oct. 2, 2009, 6 pages.

Susan, A.B.H., Kaneko, T., Noda, A., and Watanabe, M., Ion Gels Prepared by in Situ Radical Polymerization of Vinyl Monomers in an Ionic Liquid and Their Characterization as Polymer Electrolytes, J. Am. Chem. Soc. 2005, vol. 127, pg. 4976-4983.

File History U.S. Appl. No. 11/960,029 as retrieved from U.S. Patent and Trademark Office PAIR System on Feb. 10, 2011, 113 pages.

File History U.S. Appl. No. 12/049,406 as retrieved from U.S. Patent and Trademark Office PAIR System on Feb. 10, 2011, 108 pages.

File History U.S. Appl. No. 12/136,109 as retrieved from U.S. Patent and Trademark Office PAIR System on Feb. 10, 2011, 125 pages.

File History for EP Application No. 09164825.3 as retrieved from European Patent Office Electronic File System on Feb. 10, 2011, 112 pages.

File History for EP Application No. 09161184.8 as retrieved from European Patent Office Electronic File System on Feb. 10, 2011, 97 pages.

Sata, "Studies on Anion Exchange Membranes Having Permselectivity for Specific Anions in Electrodialysis—Effect of Hydrophilicity of Anion Exchange Membranes on Permselectivity of Anions", Journal of Membrane Science, vol. 167, 2000, pp. 1-31.

* cited by examiner

SEPARATING GAS USING IMMOBILIZED BUFFERS

FIELD OF THE INVENTION

The present invention relates generally to pH buffering groups, separating gases, and more particularly to the use of pH buffering groups in separating one gas from a mixture of gases.

BACKGROUND OF THE INVENTION

Various techniques have been proposed for layered structures and membranes. For example, Winnick, J., Marshall, R., and Schubert, F., "An Electrochemical Device for Carbon Dioxide Concentration. I. System Design and Performance," Ind. Eng. Chem., Process Des. Develop., Vol. 13, No. 1, 1974, pp. 59-62, describes the use of electrochemical cells for carbon dioxide concentration. These and similar methods use electrochemical or "polarization membranes." These membranes operate on the principle that $CO_2$ is converted to soluble carbonates and bicarbonates at high pH and is liberated again at low pH. $CO_2$ is preferentially absorbed on the basic side and released on the acidic side.

U.S. Pat. No. 5,773,645 describes two-dimensional electrophoresis devices that include strip gels and slab gels, isolated from each other by a removable, fluid-impermeable and electrically insulating barrier. A strip containing immobilized groups and a solid or gel matrix can be used; for example, a strip of dry immobilized pH gradient gel is described. Various positively or negatively charged groups are described.

It would be advantageous to have improved techniques relating to layered structures and membranes.

SUMMARY OF THE INVENTION

The invention provides various exemplary embodiments, including systems, electrochemical cells, structures, articles, and methods. In general, the embodiments involve layered structures or membranes that include pH buffering groups.

These and other features and advantages of exemplary embodiments of the invention are described below with reference to the accompanying drawings.

DETAILED DESCRIPTION

In the following detailed description, numeric values and ranges are provided for various aspects of the implementations described. These values and ranges are to be treated as examples only, and are not intended to limit the scope of the claims. In addition, a number of materials are identified as suitable for various facets of the implementations. These materials are to be treated as exemplary, and are not intended to limit the scope of the claims.

Many technical and industrial applications exist for layered structures and membranes; one example is gas separation, such as for carbon dioxide. Several examples of carbon dioxide separation include life support in closed environments such as spacecraft and submerged vehicles, sweetening of natural gas, and separation of carbon dioxide from power plant flue exhaust. Also, removing $CO_2$ from the environment, both to make fuels and to remediate the build-up of $CO_2$ in the atmosphere, is an application of importance due to the problem of increasing amounts of greenhouse gases in the atmosphere.

In general, current gas separators used for these and similar applications are highly inefficient, consuming about 10 to 100 times the theoretical minimum energy required for such separation with membranes or layered structures. Known methods using membranes or layered structures, such as described in Winnick et al., are relatively inefficient because recombination of $H^+$ and $OH^-$ produced at the anode and cathode, respectively, tend to degrade the pH gradient over time. Additional energy is required to maintain the gradient.

The exemplary implementations described below address the above problems with membranes and layered structures, and are applicable to carbon dioxide separation. Carbon dioxide is the main constituent of heat trapping gases responsible for accelerated climate change. Methods for efficiently extracting $CO_2$ directly from the atmosphere could enable cost effective sequestration or conversion of $CO_2$ to hydrocarbons suitable for use as fuel while still being carbon neutral. Separating gases using unsegregated buffering groups has proven difficult and may not provide necessary efficiencies to proceed.

Figure 1:
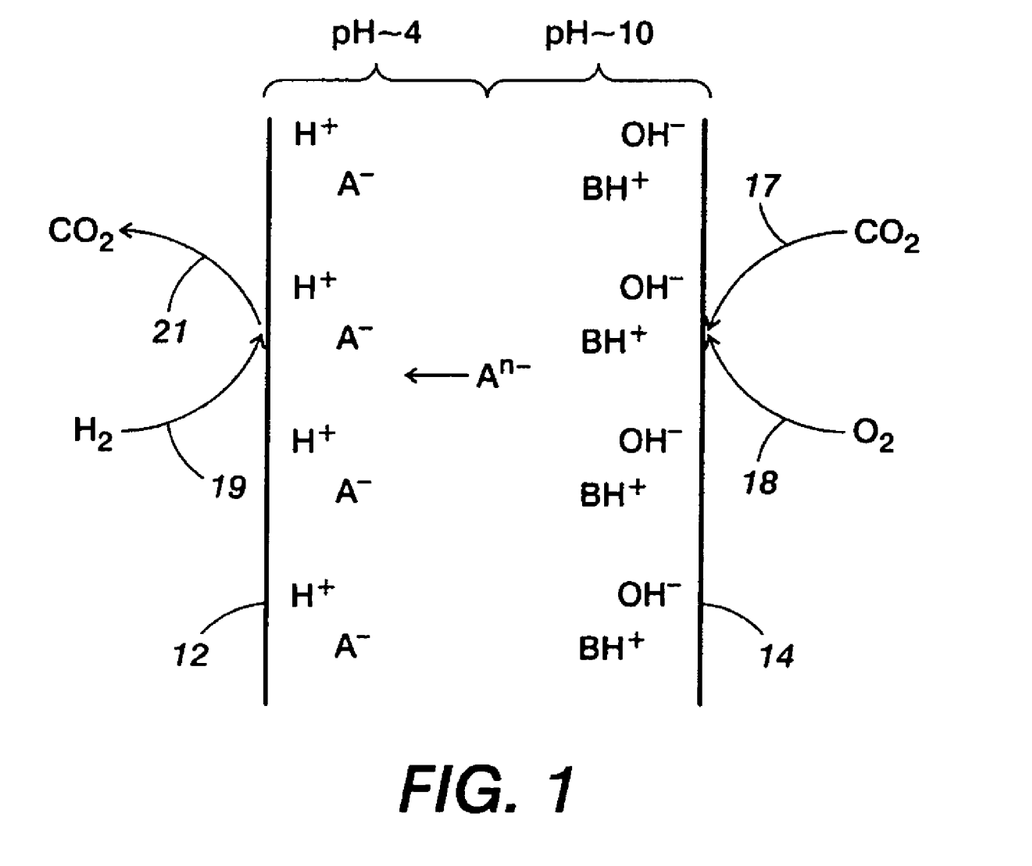
FIG. 1 is a schematic view of a layered structure or membrane that includes pH buffering groups, such as within an electrochemical cell.

FIG. 1 shows anode 12 and cathode 14 which can, for example, be in an electrochemical cell. The side of the cell with the cathode 14 is configured as the more basic side of the cell (i.e., at a higher pH), while the side with the anode 12 is configured as the more acidic or less basic side of the cell (i.e., at a lower pH). A gas, such as air, containing both $CO_2$ (per arrow 17) and $O_2$ (per arrow 18) is introduced at the cathode 14.

The $O_2$ reacts on the basic side of the cell with an electron from the cathode conductor to form $OH^-$. Dissolved $CO_2$ reacts with $OH^-$ to form carbon-containing ions, represented by $A^{n-}$. A can be any constituent known to those of ordinary skill in the art and n simply denotes the ionization state of the carbon-containing ion. For $CO_2$ separation, A will typically be carbonate or bicarbonate ions; $CO_2$ may react with other species to produce other carbon-containing ions. Hydrogen gas (per arrow 19) is fed to the cell at the anode 12 where it is divided into $2H^+$ and $2e^-$. The carbon-containing ion $A^{n-}$ travels across the cell to the lower pH side at the anode 12 where it reacts with $H^+$ to form $CO_2$ again. The newly formed $CO_2$ (per arrow 21) is liberated at the anode 12.

The cathodic and anodic reactions rely on the differential solubility of $CO_2$ and $CO_2$-related carbon-containing species at different pH levels and operate independently of electrode potential. Without pH buffering groups, $H^+$ and $OH^-$ tend to diffuse across the cell. The membrane includes sufficient pH buffering groups to selectively reduce $H^+$ and $OH^-$ ionic current density, relative to the ionic current density of the carbon-containing ions. The term "sufficient pH buffering groups" is meant to encompass the selection, quantity, and configuration of the pH buffering groups within the cell. The ions that are transported across the cell complete the circuit between the anode and the cathode. The relative ionic current density of the various species can be measured at each electrode to determine the relative current density of each. The pH buffering groups are thus believed to reduce diffusion of $H^+$ and $OH^-$ across the cell, while permitting or promoting carbon-containing ion transport. This can be confirmed by measuring Faradaic efficiency, as described below for example.

By immobilizing, confining, or segregating pH buffering groups in regions between anode 12 and cathode 14 shown in FIG. 1, one can modify and control the pH profile between anode 12 and cathode 14. As a simple example, the pH gradient could be made linear by immobilizing the appropriate gradient of buffering groups, but the invention is not so limited. The gradient may also be configured as multiple gradients, e.g., in different regions between anode 12 and cathode 14, and may be continuous, discontinuous, or non-linear. The regions with immobilized or otherwise constrained pH buffering groups may occupy all or only some of the space between anode 12 and cathode 14. The pH buffering groups may be immobilized, confined, or segregated in multiple layers, each differing from the other in pH, chemical composition, concentration, ionization levels, or otherwise. In this way, the pH profile may be manipulated across the cell.

While FIG. 1 shows hydrogen gas as the fuel for the reactions, any hydrogen-containing molecule may be used that, when consumed at the anode, produces protons. Examples of such materials include methanol and other alcohols, metal hydrides, and methane or other simple hydrocarbon compounds.

FIG. 1 also shows a system separating carbon dioxide. The system could be used to separate other gases; for example, other gases that hydrolyze in aqueous solutions, such as $SO_2$ and $NO_2$ and $NH_3$, could be separated by the system described herein.

The pH buffering groups can be immobilized, confined, or segregated, such as by being fixed to a support such as a polymer, particle, or other matrix; by being confined in a gel; or by being segregated by a semi-permeable membrane that is impermeable to the molecules containing the buffering groups, in order to assist in regulating the pH profile between the anode and cathode. Typical buffering functional groups that may be used include phosphate, acetate, amine groups, and carboxylic acid groups along with the respective conjugate acids and bases.

Figure 2:
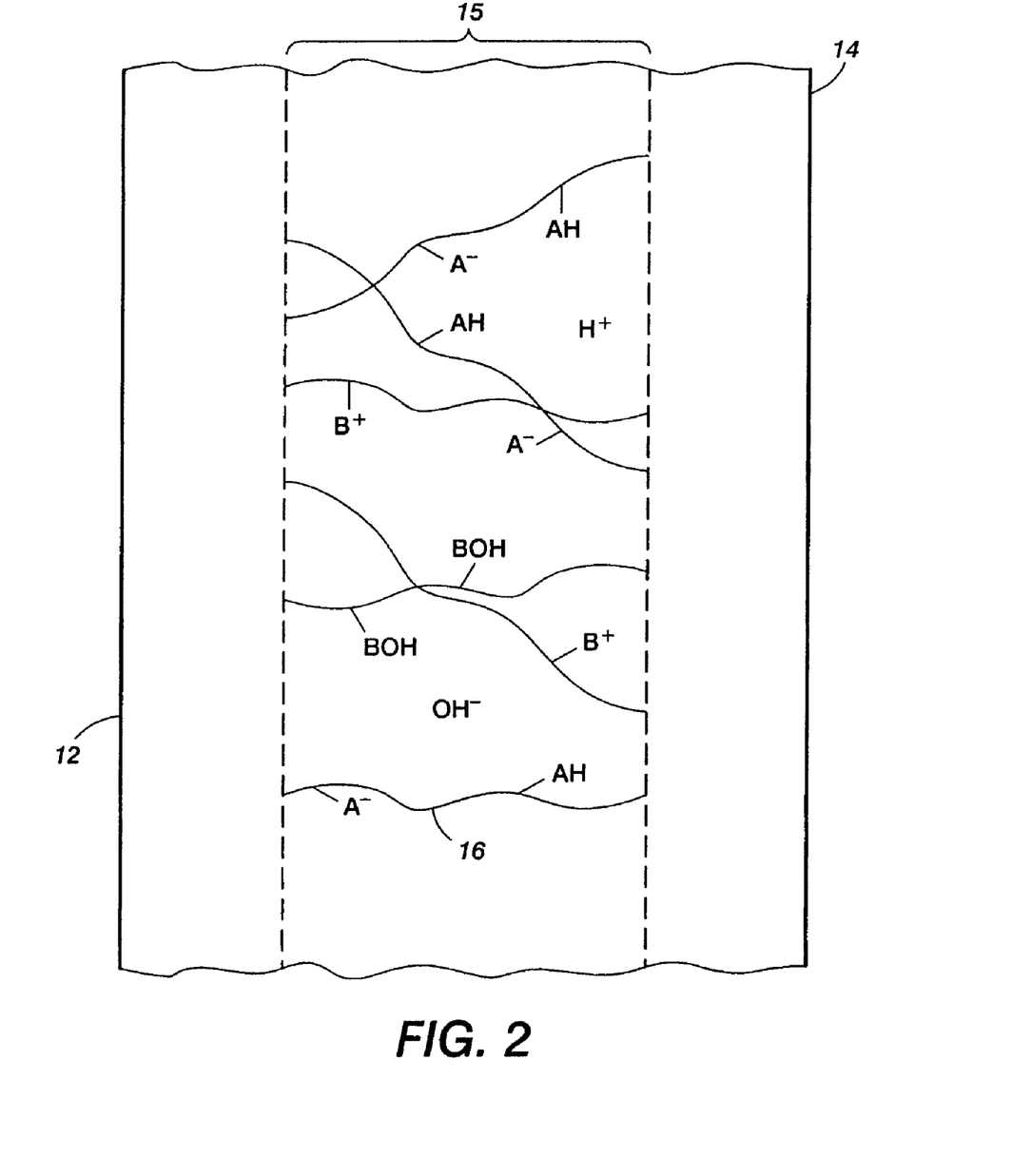
FIG. 2 is a schematic view showing immobilized buffering groups within a layered structure or membrane as in FIG. 1.

FIG. 2 shows one example of immobilized buffering groups in a membrane between a cathode and an anode. FIG. 2 shows an implementation wherein the buffering groups are segregated within a particular region or layer 15 by immobilization, and region or layer 15 is separated from anode 12 and cathode 14 by regions that are substantially free of buffering groups. While this region is shown in FIG. 2 as being free of buffering groups, the region may include buffering groups that do not substantially affect the mobility of the ions from anode 12 to cathode 14, as described below. In FIG. 2, the buffering groups are immobilized by support 16, which is illustratively a porous matrix that occupies a region between the lower pH region adjacent to the anode and a higher pH region adjacent to the cathode. The matrix can be, for example, a polymer gel that confines the groups, optionally supported by fibers or other solid support. As another example, the matrix can be solid fibers or particles woven or bound together, with the buffering groups bound on the surfaces.

The buffering groups in this and other implementations can be of one species or a mixture of species giving a desired pH.

FIG. 2 shows two species, A and B, AH being in equilibrium with $A^-$ and $H^+$ and BOH being in equilibrium with $B^+$ and $OH^-$. A and B are meant to generically represent acidic and basic groups, not any one particular type of group. Acidic or basic groups with other equilibria can also be used. For example, the basic group immobilized by the matrix could be $—NH_3^+$ in an aqueous solution in equilibrium with $—NH_2$ according to the equilibrium reaction $—NH_3^+ + OH^- \rightarrow —NH_2 + H_2O$.

Buffering groups can also be segregated within a region by semi-permeable membranes. Each semi-permeable membrane could simply operate by preventing movement of large molecules across it. For example, a membrane could be impermeable to polymer with buffering groups on it based on the molecular weight of the polymer. A high molecular weight polymer would be blocked by such a membrane.

Figure 3:
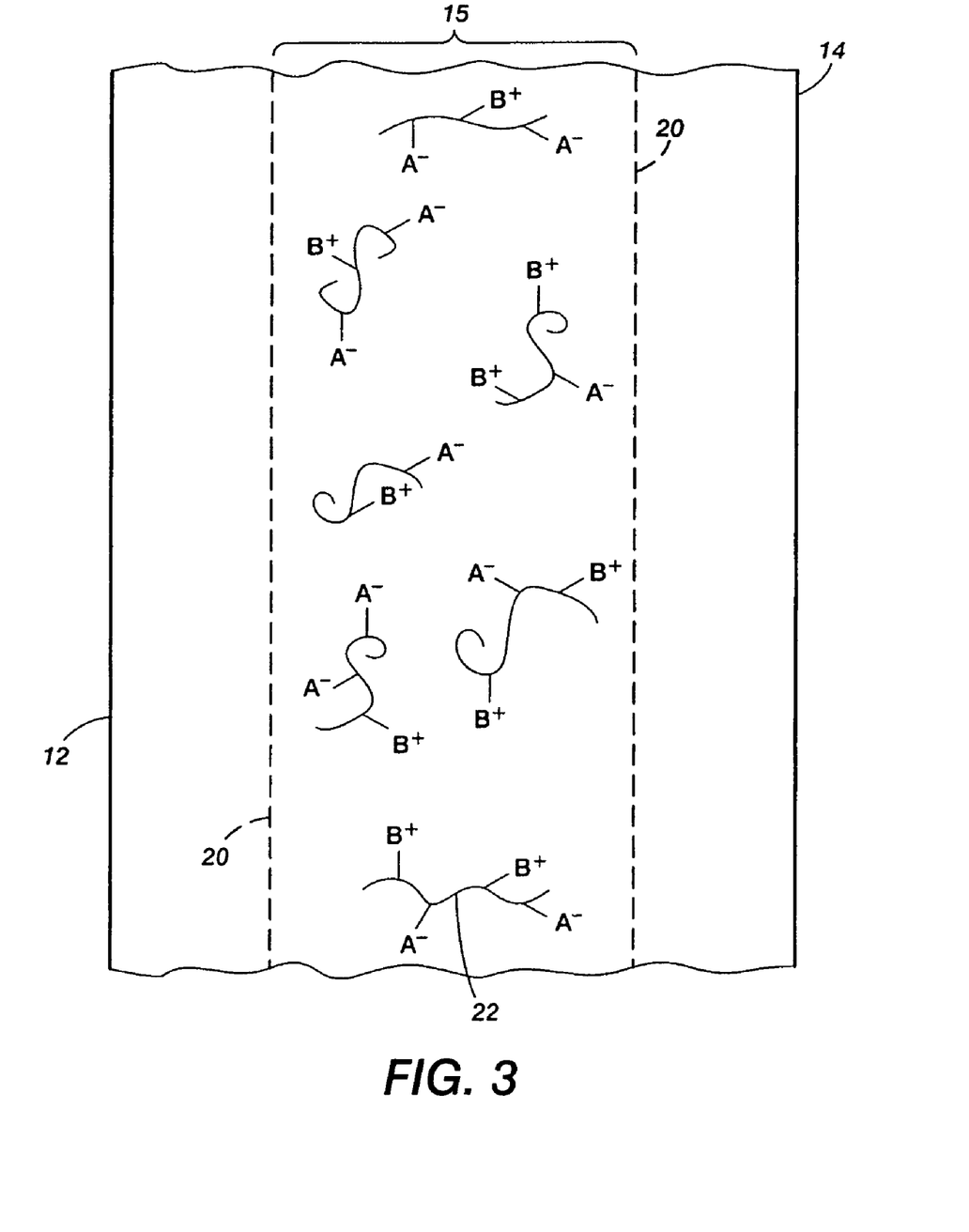
FIG. 3 is a schematic view showing buffering groups segregated between semi-permeable membranes within a layered structure or membrane as in FIG. 1.

FIG. 3 shows another example of a membrane in an implementation with buffering groups segregated within a particular region or layer between semi-permeable membranes 20. The buffering groups $A^-$ and $B^+$ are bound or otherwise attached to oligomers, polymers, or other particles (represented by 22) that cannot migrate through semi-permeable membranes 20. The oligomers, polymers, or particles are not otherwise immobilized. In this implementation, there are regions or layers between anode 12 and anode-side membrane 20 and cathode 14 and cathode-side membrane 20 and these regions are substantially free of pH buffering groups. As noted above, it may be desirable to include pH buffering groups within these regions, so long as they do not substantially affect the ion mobility between anode 12 and cathode 14.

Each semi-permeable barrier is chosen to assure that the oligomeric or polymeric buffering entities cannot migrate through it, such as by selecting an appropriate pore size or molecular weight cut-off value. For example, the semipermeable membrane may be a dialysis-type membrane with a molecular weight cut-off value that prevents movement of the chosen oligomeric or polymeric buffering entities.

The region with segregated buffering groups between membranes 20 has two sides. When implemented to separate $CO_2$, adjacent to one side is a region in which a cathodic reaction of $O_2$ to $OH^-$ takes place and carbon-containing ions are formed and begin to migrate towards the anode. Adjacent to the other side is a region in which the anodic reaction of $H_2$ to H+ takes place and carbon-containing ions that migrate from the cathodic region react to form $CO_2$. As noted above, these regions are typically both substantially free of pH buffering groups, or at least free of pH buffering groups that significantly affect ion mobility between anode 12 and cathode 14.

To illustrate the utility of structures in FIGS. 2 and 3, consider the example wherein a membrane as in FIG. 2 or 3 comprises immobilized buffering groups of sufficient concentration and proper pK to maintain the pH in the buffered region at a desired value, e.g., at a specified value between pH=5 and pH=9. In this example the anodic and cathodic reactions illustrated in FIG. 1 are taking place. At the cathode, the reaction with $O_2$ is creating $OH^-$, and it is desired that the $OH^-$ react in the presence of $CO_2$ to form carbon-containing ions at or near the same rate that OH– is being produced. Thus, it is desired to minimize diffusion or electric-field driven migration of $OH^-$ to the lower pH region near the anode. At the anode, the reaction with $H_2$ is creating $H^+$, and it is desired that the $H^+$ react with carbon-containing ions to form $CO_2$ at or near the same rate that H+ is being produced. Thus, it is desired to minimize diffusion or electric-field driven migration of $H^+$ to the higher pH region near the cathode. Migration of $OH^-$ to the anode and/or $H^+$ to the cathode is undesirable because it increases the pH at the anode, decreases the pH at the cathode, and expends chemical energy without transporting $CO_2$, decreasing the overall efficiency of the system. When the $OH^-$ ions meet $H^+$, they tend to form water, instead of transporting $CO_2$. In addition, it is desired that the carbon-containing anions be predominantly monovalent at some point between the anode and cathode to maximize the ratio of carbon dioxide transport versus ionic current. By maximizing this ratio, the energy efficiency is increased because the amount of $CO_2$ separated per unit of electrical current is maximized.

Having an intermediate region buffered at a pH in the range of about 5 to 9 aids in accomplishing these desired attributes. Consider, for example, an intermediate region as in FIG. 2 buffered at pH=7, and carbon-containing ion concentrations above about 100 μM. At pH=7, the concentration of $H^+$ and $OH^-$ is $10^{-7}M$, causing the electric-field driven migration of H+ and $OH^-$ to be low because the concentration of these two ions is low compared with the concentration of carbon-containing ions. For an immobilized buffering region of sufficient thickness, concentration gradient-driven diffusion of $H^+$ and $OH^-$ will also be low because the concentrations, and therefore the gradients, of these ions will be low in much of the interior of the buffering region. The ratio of bicarbonate to carbonate ion in solution is a function of pH and is high below about pH=9, so the buffering region will create a location between the anode and cathode where $[HCO_3^-]/[CO_3^{2-}]$ is large. Consequently, the rate of migration of bicarbonate ions ($HCO_3^-$) will be large relative to carbonate ions ($CO_3^{2-}$). Thus, this exemplary buffering region also has the desired effect on the valency of the carbon-containing ions.

Having a high pH region at the cathode and a low pH region at the anode will also aid in accelerating the capture and liberation of $CO_2$, respectively. A high pH region at the cathode implies a large OH– concentration which will accelerate the conversion of $CO_2$ to bicarbonate according to the reaction $CO_2+OH-\rightarrow HCO_3^-$. Similarly, a low pH region at the anode will accelerate the conversion of bicarbonate to $CO_2$ again according to the reaction $HCO_3^-+H^+\rightarrow CO_2+H_2O$. The reactions of $O_2$ at the cathode and $H_2$ at the anode increase the pH at the cathode and decrease it at the anode, respectively.

Instead of being substantially free of pH buffering groups, a layer of the membrane may include immobilized buffering groups adjacent to the cathode, e.g., immobilized buffering groups in the "higher pH" region in FIG. 2 or 3 that buffer at a high pH, can be used to help maintain a high pH at the cathode. Similarly, a layer of the membrane with relatively low pH immobilized buffering groups can be used to help maintain a relatively low pH at the anode. This implementation may be desirable to maintain a pH that promotes the reactions at each electrode. The immobilized pH buffering groups that are adjacent to the electrodes should not have a substantial effect on the mobility of the ions between the electrodes and should not affect the ionic current density in a substantial way. Thus, the immobilized pH buffering groups adjacent the electrodes would be different from those in the middle zone or layer.

The implementations shown in FIGS. 2 and 3 illustrate three layers, with the middle layer including the immobilized pH buffering groups that affect the ion mobility between anode 12 and cathode 14. If an appropriate catalyst is chosen that would permit the reaction conditions to be favorable at one of the electrodes at a similar pH to the pH present in the layer that includes the pH buffering groups, that layer could be present as a single layer adjacent to the electrode. In other words, this implementation would yield only two layers: a first layer that includes the immobilized (or segregated) pH buffering groups and is adjacent to one of the electrodes and a second layer that does not include pH buffering groups that substantially affect ion mobility adjacent to the other electrode.

Figure 4:
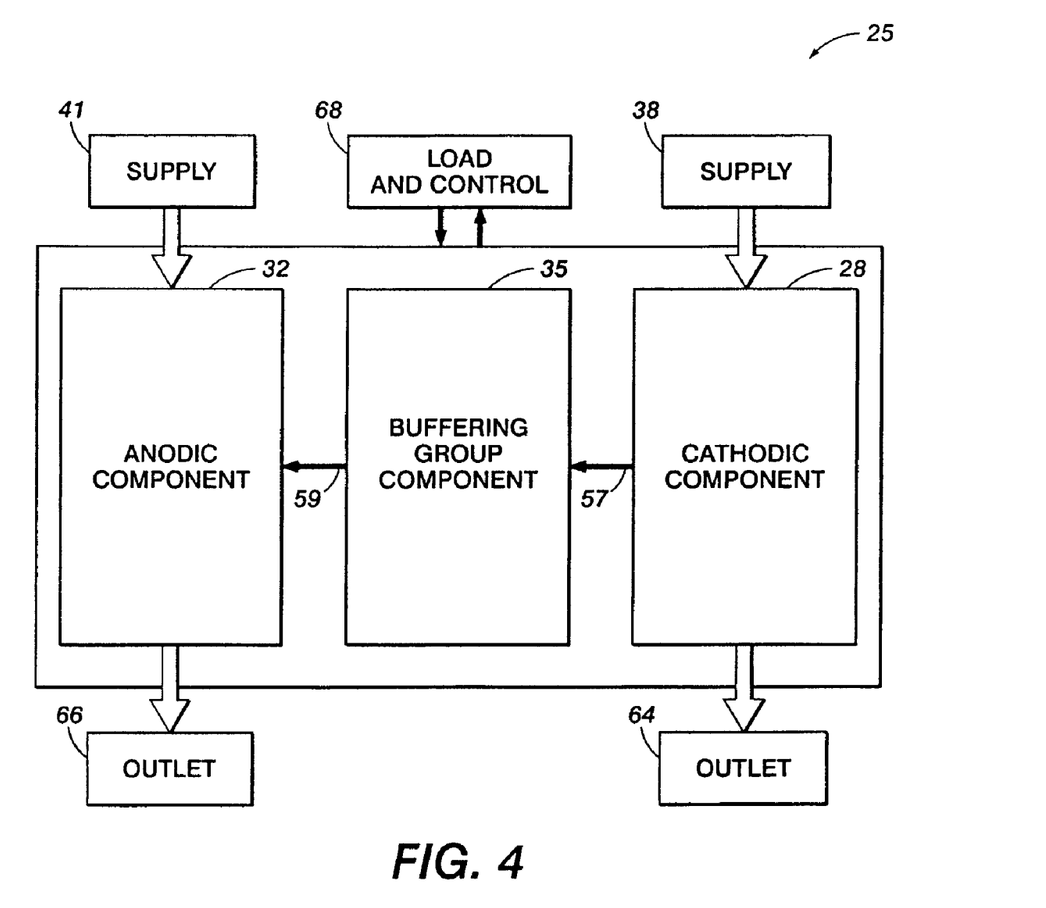
FIG. 4 is a schematic block diagram of a system in which molecules and ions can flow as in FIG. 1.

FIG. 4 shows system 25, an exemplary implementation that can include one or more electrochemical cells with membranes as described above, in which buffering group component 35 acts to regulate and control the pH profile between the anode and cathode in a desired manner. System 25 includes supply 38 and outlet 64 at cathodic component 28 and supply 41 and outlet 66 at anodic component 32. In operation, a gas (such as air or flue gas from a fossil-fuel burning power plant) that includes carbon dioxide and oxygen is introduced to cathodic component 28 from supply 38, while gas containing hydrogen is introduced to anodic component 32 from supply 41. The gas with reduced carbon dioxide content is released from cathodic component 28 through outlet 64. Carbon-containing ions transfer from a cathodic region near cathodic component 28 through pH buffering component 35 along path 57, and from pH buffering group component 35 to the anodic region near anodic component 32 along path 59. The carbon-containing ions react at anodic component 32 to form carbon dioxide that exits system 25 through outlet 66, either in gas form or dissolved in a liquid. In a typical implementation, system 25 also includes power supply and control 68 to control the load on the system and to control the electric field formed between cathodic component 28 and anodic component 32.

Figure 5:
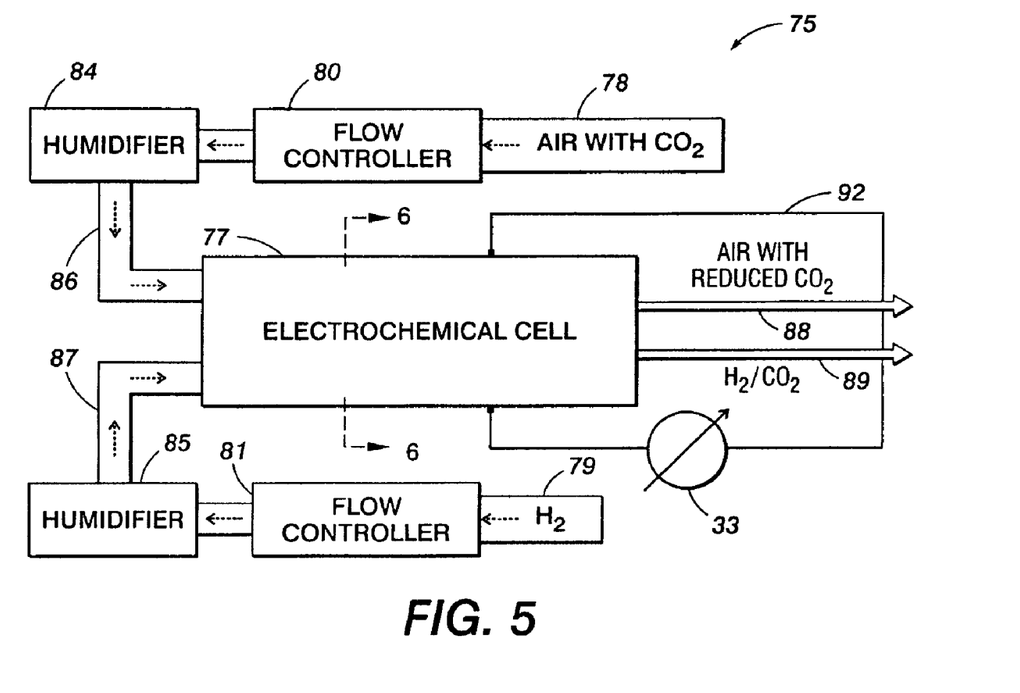
FIG. 5 is a schematic view showing flow paths of gases in a system as in FIG. 4.

FIG. 5 shows system 75, an exemplary implementation of system 25 in FIG. 3. In this implementation, air containing carbon dioxide flows through tube 78. Although FIG. 5 shows the inlet gas being air, other gases containing carbon dioxide and oxygen could also be used, such as exhausts from industrial processes. On the other side, gas containing hydrogen flows into system 75 through tube 79. Each gas stream flows through a respective flow controller 80 or 81 and through a respective humidifier 84 or 85 that controls the relative humidity of the gas stream. In some applications, such as where an ionic liquid is used, humidification may not be necessary. From there, the humidified gas streams flow in parallel through respective tubes 86 and 87 into electrochemical cell 77 where the carbon dioxide is separated from the air. Two outlets 88 and 89 are shown from system 75. Reduced carbon dioxide air flows through one outlet 88, while carbon dioxide and excess hydrogen that is not consumed during the process flow out through the other outlet 89. Variable load 33 is attached to electrochemical cell 77 to form circuit 92 that controls the power generated by electrochemical cell 77. In operation, load 33 to circuit 92 regulates the extent to which $H_2$ is permitted to generate an electrical circuit within electrochemical cell 77. Variable load 33 may be a load performing some useful function, but it may also be a battery or other energy storage or conversion device that is being charged or powered from the electrolytic cell 77.

Figure 6:
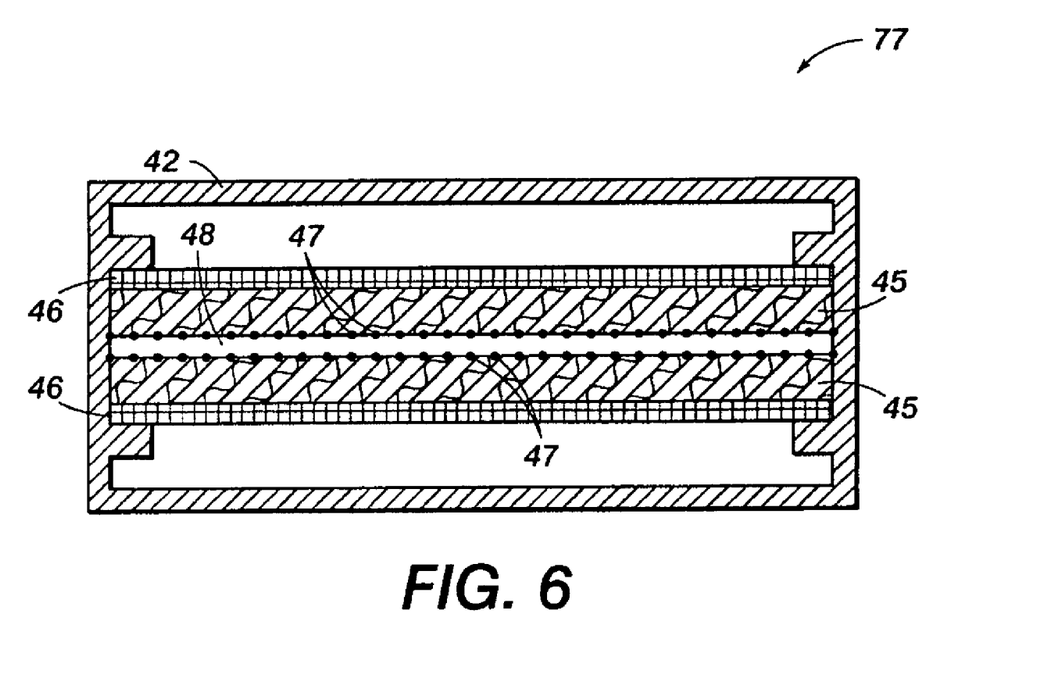
FIG. 6 is a cross-sectional view of the electrochemical cell as in FIG. 5 taken along line 5-5 of FIG. 5.

FIG. 6 shows a cross-section of an exemplary implementation of cell 77 in FIG. 5. Cell 77 is shown within enclosure 42. Membrane 48 that includes pH buffering groups is clamped or otherwise fixed in place within enclosure 42 with tubes 86 and 88 connected on one side of membrane 48 and tubes 87 and 89 connected on the other. Tubes 86, 87, 88, 89 are shown in FIG. 4. The matrix of the membrane may be a resin, porous cellulose, expanded polytetrafluoroethylene, glass fibers, sintered particles, gels, polymers, or other permeable materials.

Catalyst layers 47 formed of platinum particles or other material known to those of ordinary skill in the art are located on either side of membrane 48. The catalyst layers increase the efficiency of the system by increasing the amount of $H^+$ and $OH^-$ within the system. The catalyst increases the rate of the fuel reaction of $H_2 \rightarrow 2H^+ + 2e^-$ and the reduction of oxygen in $\frac{1}{2}O_2 + H_2O + 2e^- \rightarrow 2OH^-$. Any material known or discovered to increase the rate of this reaction may be used as the catalyst. The catalyst layers 47 may be applied by painting, air brushing, printing, or similar manner as known to those of ordinary skill in the art.

Gas diffusion layers 45 are located on either side of membrane 48 and catalyst layers 47. The gas diffusion layers permit the gases to diffuse through the pores therein from each of porous conductive layers 46 (described below) to membrane 48. The gas diffusion layers can be formed of a porous electrically conductive material such as carbon paper or carbon cloth and may be infused with a polymer, such as polytetrafluoroethylene (PTFE), in order to help prevent excess water accumulation in the gas diffusion layer.

Layers of porous conductor material 46 are attached on either side of the gas diffusion layers 45. The porous conductors can be formed of a material that conducts electricity and permits gas flow and diffusion, such as a wire mesh or similar material. Alternatively, the conductor can be a conductive piece of material, such as a piece of metal like stainless steel, with flow paths fabricated in it for transport of the gases to the gas diffusion layer. In operation, porous conductor 46 serve as electrodes, with a voltage difference across them arising from the electrochemical reactions at the anode and cathode.

A metal plate with machined gas channels acting as a "flow field", such as are commonly used in fuel cells, may also be used in place of the porous conductor material. For example, a flat plate of stainless steel with machined grooves having an inlet at one end and outlet at the other may be used. The grooved surface is placed against the gas diffusion layer defining channels where the gas passes over the gas diffusion layer. This is commonly referred to as the "flow field" in fuel cell art.

As reactions progress at catalyst layers 47, the interfaces of the catalyst layers 47 with the gas diffusion layer 45 and membrane 48 behave similarly to electrodes, with one behaving like a cathode and the other like an anode. In operation, an electric field is therefore formed across membrane 48 between catalyst layers 47 at the interfaces of gas diffusion layers 45 and membrane 48.

Figure 7:
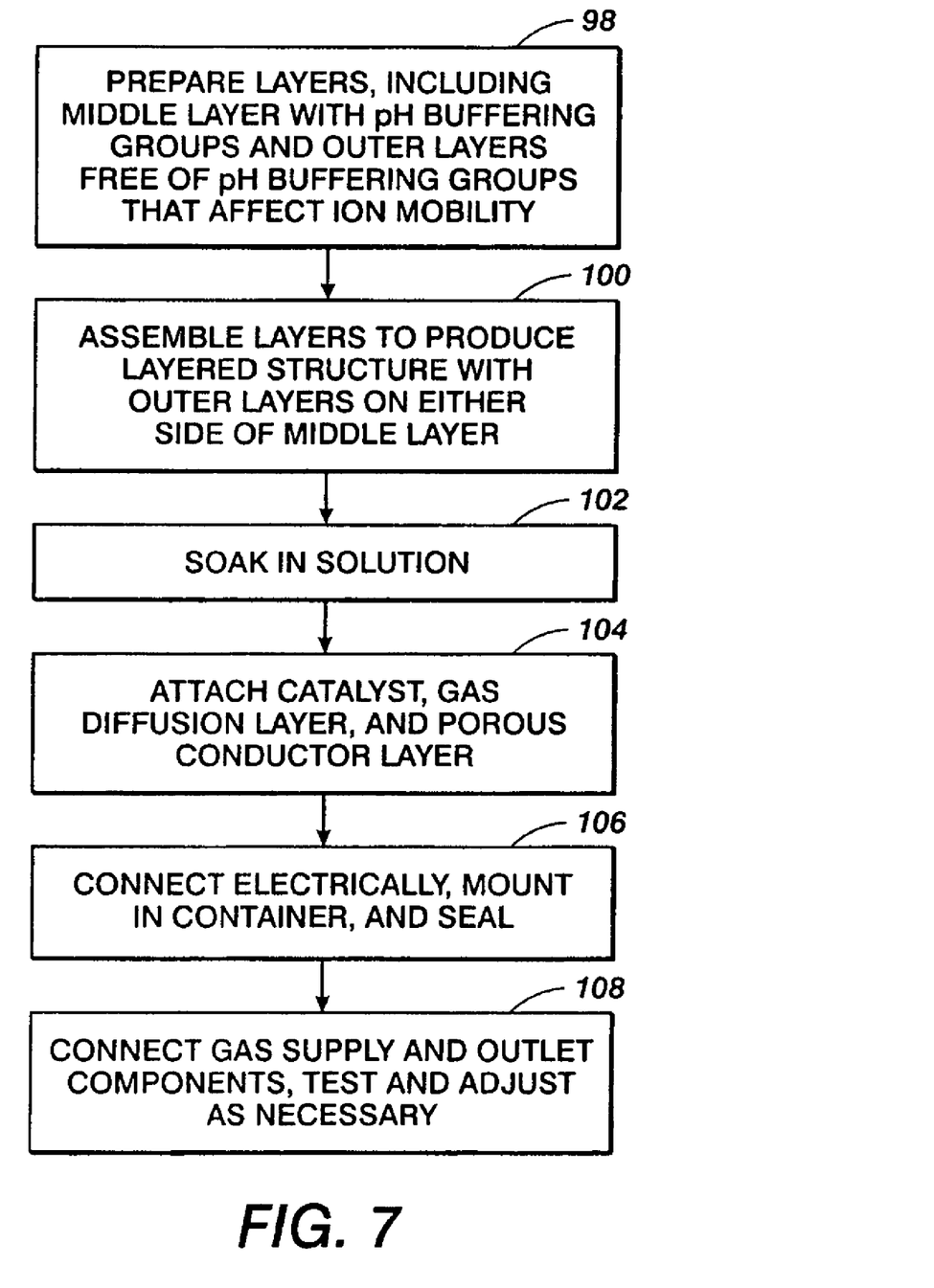
FIG. 7 is a flow chart showing a process for producing a system as in FIGS. 4 and 5.

FIG. 7 shows exemplary steps that can produce a system as described herein. In the operations in box 98, layers are prepared including one or more layers with pH buffering groups and one or more layers that are substantially free of pH buffering groups that affect ion mobility. The membrane is permeable to ions and may include a gel. The buffering groups may be immobilized to the membrane by covalent bonding or by a gel, or the buffering groups may be bound to oligomers, polymers, or other particles that are not permeable to the membrane. In one implementation, the gel may be a cross-linked polymer gel, with or without additional matrix support, such as woven fibers.

Immobilization of the pH buffering groups can be implemented in various ways. For example, the buffering groups can be immobilized by fixing them to a support such as a polymer, polymer gel, matrix, or permeable or semi-permeable membrane, including as an example ion exchange membranes, using techniques similar to those disclosed in U.S. patent application Ser. No. 11/960,029, filed Dec. 19, 2007, the contents of which are incorporated herein by reference. The buffering groups could also be used with ionic liquids that are simply supported on a membrane or other matrix or that may be immobilized on a membrane or other matrix, including as an example techniques similar to that disclosed in U.S. patent application Ser. No. 12/049,406, filed Mar. 17, 2008, the contents of which are incorporated herein by reference. Another option would be to cast a membrane using a formulation that contains the buffering groups. For example, a membrane could be a cast of a polyacrylamide gel from acrylamide monomers, along with Immobiline II™ monomers as buffering groups. Less expensive gels could be cast using other polymerization techniques, including vinyl polymerization with less expensive monomers, condensation polymerization, or any other polymerization known to those skilled in the art of polymerization processes and chemistries. Yet another alternative would be to penetrate a matrix with a monomer solution that includes buffering groups and have the buffering gel cured in the matrix. For example, a monomer solution of acrylamide and Immobiline™ monomers, crosslinker, catalyst, and initiator could penetrate a cellulose, nylon, or sintered glass matrix, and the monomers could then be cured to create an immobilized polymer gel. Similar polyacrylamide gels and methods for their synthesis are known to those skilled in the art of making polyacrylamide gels for protein and DNA electrophoresis studies, for example.

In the operations in box 100, a layered structure is made by assembling the layers that include the immobilized pH buffering groups and those that are substantially free of pH buffering groups that affect ion mobility. Generally, the layer that includes the immobilized pH buffering groups will be the middle layer between the layers that are substantially free of such groups.

In the operations of box 102, the membrane is soaked in an aqueous solution, e.g., a solution of cesium bicarbonate or carbonate, to prepare it for use in the electrochemical cell. In the operations of box 104, on each side of the composite membrane, the catalyst, gas diffusion layer, and porous conductor layer are attached. In the operations in box 106, the system is connected electrically, mounted in a container, and sealed. Finally, in the operations box 108, the load and outlet components are connected. The system can be tested and adjusted as necessary.

If necessary or desirable, the system can easily be designed to permit control of the temperature and pressure of the various gases as they move throughout. A gas analyzer may be used to test the various outlet gases to determine whether the system is operating as desired. The outlet gases may be used in any application desired. The outlet gases may be pumped to another location or used in reactions or other applications nearby.

EXAMPLE

A three-layer membrane was prepared with the middle layer being a gel solution having pH buffering groups and the outer layers being free of pH buffering groups.

The middle layer was prepared as follows:

Mix 5.6 ml PlusOne ReadySol (40% T, 3% C, GE Healthcare);

9.30 ml deionized water;

0.53 ml Immobiline II pK=3.6 (GE Healthcare);

0.57 ml Immobiline II pK=9.3 (GE Healthcare);

5 µL PlusOne TEMED (GE Healthcare);

75 µL 10% ammonium persulfate initiator solution.

The ReadySol is a solution containing the acrylamide monomer and crosslinker. The Immobiline II reagents are monomers with buffering groups.

Two 5"×5" glass pieces were prepared with PlusOne Repel-Silane ES to make them hydrophobic and to enable easy release of the finished layer. 5"×5" nylon mesh (198×

198, 50 microns thick) was placed on one of the glass pieces. The solution was dropped evenly on the nylon mesh right after adding the initiator, completely wetting and filling the mesh, avoiding air bubbles. The second glass plate was placed on top of the nylon mesh and gel solution, avoiding trapping any air bubbles. The pieces were clamped together and allowed to cure at room temperature for more than 2 hours. A control was prepared in the same manner, but omitting the Immobiline II reagents.

The outer layers were prepared as follows: 0.21 g cesium bicarbonate was mixed in 1.5 ml ionic liquid (1-butyl-1-methyl-pyrrolidinium diacyanamide)+0.5 ml water. The solution was dropped evenly onto a Whatman #3 filter paper (diameter cut to 9.3 cm, thickness=370 microns), completely wetting the filter paper. The filter paper was used as the support matrix. The membrane was assembled with the outer layers surrounding the middle layer.

An electrochemical cell that includes the membrane was assembled as follows: Carbon paper loaded with 5% PTFE was used for the gas diffusion layers (GDL). Platinum particles suspended in a PTFE solution were painted onto one of the faces of each of two GDL's, which were then allowed to dry. The Pt particle-coated faces of the GDL's were then placed against the ion exchange membrane to form a stack that was then placed into the cell. The conductive metal plates, as described above, were pushed against the GDL's and the cell was sealed.

The cell was operated with the following gas flow rates: $H_2$ at anode=70 standard cubic centimeters per minute (sccm), $N_2$ at cathode=1184 sccm, $O_2$ at cathode=315 sccm, $CO_2$ at cathode 0.6 sccm. A load was applied across the cell using a BK Precision 8500 300W Programmable DC Electronic Load.

For the three-layer membrane with immobilized buffering groups in the middle layer, the results are:

| load voltage | CO2 transported, sccm | efficiency, % |
| --- | --- | --- |
| 100 mV | 0.14 | 19.9 |
| 50 mV | 0.14 | 18.9 |
| 10 mV | 0.15 | 19.0 |

For the control experiment with the three-layer membrane without Immobiline II in the middle layer, the results are:

| load voltage | CO2 transported, sccm | efficiency, % |
| --- | --- | --- |
| 100 mV | 0.13 | 15.1 |
| 50 mV | 0.14 | 14.5 |
| 10 mV | 0.14 | 14.0 |

The Faradaic efficiency is calculated according to $$\eta = \frac{\text{molar rate of absorption of CO2 at the cathode in } sccm}{\text{current in amps}} \cdot 0.07175 \cdot 100\%$$

where the term 0.07175=(min/60 sec)*F*P/RT in the correct units to yield a dimensionless efficiency, F being Faraday's constant (96485 C/mole), P being the standard pressure (0.101325 $J/cm^3$), R being the gas constant (8.314 J/mole/K), and T being the standard temperature (273.15 K).

The efficiencies achieved using the membrane containing Immobiline II are about 1.33 times greater than the control; the use of the buffering groups improves the efficiency. It is believed, however, that significantly greater efficiencies (greater than 70%) can be achieved by optimizing the catalysts, pK of the immobilized buffering groups, the thickness of the layers, catalysis of hydrogen and oxygen, and other process parameters.

Faradaic efficiency is the energy efficiency with which a species is electrolyzed at a given charge. High Faradaic efficiencies suggest that the process requires lower energy to complete the reaction making the process more feasible. In this case, Faradaic efficiency is a measure of the ratio of $CO_2$ capture rate over the electric current through the system. A Faradaic efficiency of 100% means exactly one $CO_2$ molecule is captured for every electron passing through the system (one hydrogen molecule makes two electrons).

As used herein, the term "matrix" refers to a polymer, resin, porous solid, or other material structured so that it can support pH buffering groups. For example, buffering groups may be bonded to or within a matrix.

The term "gel" refers to a fibrous and/or cross-linked material (usually polymeric) which includes a substantial fraction of water or other solvent immobilized therein. A gel may be used as a matrix, i.e., pH buffering groups or other material may be bonded to or within the gel. A gel matrix may also be supported by another matrix, e.g., a mesh made of a solid material or a porous solid.

As used herein, a "buffering group" or "pH buffering group" refers to a chemical functional group that creates or maintains pH within a range. For example, an acidic pH buffering group tends to maintain the region at a relatively low pH (e.g., less than 7), while a basic pH buffering group tends to maintain the region at a relatively high pH (e.g., greater than 7). The pH range produced or maintained by a group depends not only on the group's characteristics, but also on its concentration, concentration of other species, the chemical makeup of surrounding fluids, and other environmental parameters.

To "immobilize" a pH buffering group means to keep the buffering group in place relative to movable ions and molecules around it, i.e., to prevent it from moving as the ions and molecules move. Immobilizing the buffering group may be accomplished by bonding or fixing it such as to a matrix, gel, or similar structure or by confining it within a relatively small region of a structure such as a gel. To "segregate" a pH buffering group means to keep the buffering groups within a region, such as by immobilizing it within the region or by using a semi-permeable membrane to keep it from moving out of the region, such a membrane could also prevent the group from interacting with other pH buffering groups or keep it out of layers or regions that are free from pH buffering groups.

As used herein, a "layer" is a thickness of material, whether or not patterned in any way. A layer "includes" a specified type of material if material of the specified type is present in any part of the layer; a layer is "of" a specified type of material if material of the specified type is predominant throughout the layer. A layer may be homogeneous or its composition or characteristics may vary. A layer may include two or more layers or parts of layers within it, sometimes referred to as "sub-layers".

A "layered structure" refers herein to a structure that includes layers.

The term "membrane" refers to a structure that is permeable to fluids, such as gas, liquid, or aerosol. A membrane may be "semi-permeable" meaning that it is permeable to some substances and impermeable to others. A membrane may include one or more layers of matrix and may include other semi-permeable membranes within it.

The terms "cathodic component" and "anodic component" refer, respectively, to structures or materials that act as electrodes and from which positive or negative electric current flows. A "cathodic component" can include an area in which reduction occurs, while an "anodic component" can include an area in which oxidation occurs. Phrases such as "cathodic region," "at the cathode," "near the cathode," and the like refer to the liquid and gaseous regions near the cathode. Phrases referencing the "anode" have similar meanings with respect to the liquid and gaseous regions near the anode.

The term "electrochemical cell" refers to a vessel that produces current by the releasing and accepting of electrons from chemical reactions taking place therein.

"Carbon-containing ions" simply refer to ions that contain the element carbon. They may be anions or cations with the ionization occurring on the carbon atom or on another atom within the ion.

"Migration" or "transport" refers to flux; for example, concentration gradient-driven diffusion or diffusion driven by ionic current, or other types of flux.

Those skilled in the art will appreciate that $CO_2$ is not the only gas that can be separated by the implementations described herein. Systems in which a gas other than $CO_2$ dissolves in a liquid, reacts with a product of an electrochemical reaction to form an ion, migrates through the electrochemical cell, reacts with a product of an electrochemical reaction at the opposite electrode to form a dissolved gas molecule, and desorbs from the liquid into the gas phase are also possible. Such systems include systems in which the dissolved gas hydrolyzes by reaction with $OH^-$ at the cathode to form an ion, the ion migrates from the cathode side of the electrochemical cell to the anode side, and the ion reacts with $H^+$ at the anode side to convert back to the dissolved neutral gas molecule that then desorbs into the gas phase at the anode side of the cell. Applying the implementations described herein to any of the above systems to yield improved efficiency of dissolved gas transport relative to electrical current is within the scope of the invention described herein.

While the invention has been described in conjunction with specific exemplary implementations, it is evident to those skilled in the art that many alternatives, modifications, and variations will be apparent in light of the foregoing description. Accordingly, the invention is intended to embrace all other such alternatives, modifications, and variations that fall within the spirit and scope of the appended claims.

What is claimed is:

1. A system comprising:
   a cathodic component and an anodic component with a region between them; and
   a layered structure in the region between the cathodic component and the anodic component;
   the cathodic component, anodic component, and layered structure being configured such that, with oxygen and carbon dioxide at the cathodic component and hydrogen-containing molecules that can provide protons at the anodic component, reactions occur at the cathodic component producing carbon-containing ions, the carbon-containing ions are transported from the cathodic component to the anodic component, and reactions occur at the anodic component producing carbon dioxide;
   the layered structure including three or more layers in order between the cathodic and anodic components, the layers including:
   adjacent the cathodic and anodic components, respective cathode-side and anode-side layers; and
   between the cathode-side and anode-side layers, one or more buffering group layers, each including pH buffering groups;
   the pH buffering groups being segregated in the pH buffering group layers so that they do not travel into the anode-side and cathode-side layers; the buffering group layers containing sufficient pH buffering groups to reduce ionic current density of at least one of protons between the anodic component and the cathodic component and hydroxyl ions between the cathodic component and the anodic component, relative to ionic current density of the carbon-containing ions, the pH buffering groups permitting the transport of the carbon-containing ions between the cathodic component and the anodic component.

2. The system of claim 1, wherein the layered structure further includes at least one of:
   an immobilized portion of the segregated pH buffering groups of the pH buffering group layer, the groups in the immobilized portion being immobilized within the pH buffering group layer by bonding to matrix;
   a confined portion of the segregated pH buffering groups of the pH buffering group layer, the groups in the confined portion being confined within the pH buffering group layer by a gel; and
   a semi-permeable membrane at a boundary of the pH buffering group layer, the semi-permeable membrane segregating at least some of the segregated pH buffering groups of the pH buffering group layer within the pH buffering group layer.

3. The system of claim 1, wherein the pH buffering groups include one or more of phosphate, acetate, carboxylic acids or amine groups, or conjugate acids or bases thereof.

4. The system of claim 1, wherein the anode-side and cathode-side layers are substantially free of pH buffering groups.

5. An electrochemical cell comprising:
   a cathodic component and an anodic component with a region between them;
   a membrane component in the region between the cathodic component and the anodic component; and
   a connecting component that connects the cathodic component, anodic component, and membrane component in a configuration such that, with oxygen and carbon dioxide at the cathodic component and hydrogen-containing molecules that can provide protons at the anodic component, reactions occur at the cathodic component producing carbon-containing ions, the carbon-containing ions are transported from the cathodic component to the anodic component, and reactions occur at the anodic component producing carbon dioxide;
   the membrane component including three or more layers in order between the cathodic and anodic components, the layers including:
   adjacent the cathodic and anodic components, respective cathode-side and anode-side layers; and
   between the cathode-side and anode-side layers, one or more buffering group layers, each including pH buffering groups;
   the pH buffering groups being segregated in the pH buffering group layers so that they do not travel into the anode-side and cathode-side layers.

6. The electrochemical cell of claim 5, wherein the pH buffering groups are immobilized by bonding to the membrane or by being confined by a gel within the membrane.

7. The electrochemical cell of claim 5, wherein the membrane has first and second opposing sides, the cell further including:
   catalyst on the first and second opposing sides of the membrane; and
   first and second electrically conductive structures over the first and second catalyst layers, each electrically conductive structure being electrically connectable to a load and permitting gas diffusion to the catalyst.

8. The electrochemical cell of claim 7, wherein:
   the pH buffering groups in the buffering group layers comprise one or more of phosphate, acetate, and amine groups, carboxylic acids, or conjugate acids or bases thereof;
   the catalyst comprises platinum; and
   the electrically conductive structures include at least one of a metal plate or wire mesh and also include layers of carbon paper containing polytetrafluoroethylene.

9. An article of manufacture comprising:
   a semi-permeable layered structure that includes:
   first and second surfaces that are approximately parallel and disposed away from each other;
   layers between and extending approximately parallel to the first and second surfaces so that ions being transported through the layered structure from the first surface to the second surface can pass through the layers in an order; and
   in each of a set of the layers, respective segregated pH buffering groups that are segregated within the layer; a first layer in the set having at least one of:
      an adjacent layer in the order, the adjacent layer containing respective pH buffering groups; the respective segregated pH buffering groups of the first layer and the respective pH buffering groups of the adjacent layer being different; and
      an adjacent layer in the order, the adjacent layer being substantially free of pH buffering groups;
   the layered structure further including at least one of:
      an immobilized portion of the respective segregated pH buffering groups of the first layer, the groups in the immobilized portion being immobilized within the first layer by bonding to matrix;
      a confined portion of the respective segregated pH buffering groups of the first layer, the groups in the confined portion being confined within the first layer by gel; and
      a semi-permeable membrane at a boundary of the first layer, the semi-permeable membrane segregating at least some of the respective segregated pH buffering groups of the first layer within the first layer.

10. The article of claim 9, further comprising circuitry to connect the first and second electrically conductive structures to a load.

11. The article of claim 10, further comprising:
   an anodic component that includes a first catalyst layer and the first electrically conductive structure; and
   a cathodic component that includes a second catalyst layer and the second electrically conductive structure.

12. The article of claim 9, further comprising an enclosure within which the membrane is sealed.

13. The article of claim 11, and further comprising:
   a source of gas containing carbon dioxide and an outlet for air with reduced carbon dioxide near the cathodic component; and
   a source of hydrogen gas and an outlet for carbon dioxide and unused hydrogen gas near the anodic component.

14. A method of producing the article of claim 9, comprising:
   arranging the layers to maintain a pH profile between the first and second surfaces.

15. A method of producing the article of claim 9, comprising at least one of:
   bonding the immobilized portion of pH buffering groups of the first layer to a matrix; and
   confining the confined portion of pH buffering groups of the first layer in a gel.

16. A method of producing the article of claim 9 in which the layered structure includes the semi-permeable membrane; the method comprising:
   bonding at least some of the pH buffering groups of the first layer to oligomers, polymers, or other particles that cannot pass through the membrane.

* * * * *